(12) United States Patent
Peura et al.

(10) Patent No.: US 11,701,966 B2
(45) Date of Patent: Jul. 18, 2023

(54) DRIVELINE COMPONENT INCLUDING MULTI-FUNCTION ACTUATOR

(71) Applicant: GKN Automotive Limited, Birmingham (GB)

(72) Inventors: Brent M. Peura, Farmington, MI (US); Matthew R. Schmalenberg, Auburn Hills, MI (US)

(73) Assignee: GKN Automotive Limited, Birmingham (GB)

( * ) Notice: Subject to any disclaimer, the term of this patent is extended or adjusted under 35 U.S.C. 154(b) by 38 days.

(21) Appl. No.: 17/599,655

(22) PCT Filed: Mar. 31, 2020

(86) PCT No.: PCT/US2020/025981
§ 371 (c)(1),
(2) Date: Sep. 29, 2021

(87) PCT Pub. No.: WO2020/205876
PCT Pub. Date: Oct. 8, 2020

(65) Prior Publication Data
US 2022/0194219 A1    Jun. 23, 2022

Related U.S. Application Data

(60) Provisional application No. 62/829,373, filed on Apr. 4, 2019.

(51) Int. Cl.
*F16H 63/30*      (2006.01)
*B60K 17/02*      (2006.01)
(Continued)

(52) U.S. Cl.
CPC ............ *B60K 17/02* (2013.01); *B60K 17/346* (2013.01); *F16H 3/54* (2013.01); *F16H 48/08* (2013.01);
(Continued)

(58) Field of Classification Search
CPC ......... B60K 17/02; B60K 17/346; F16H 3/54; F16H 48/08; F16H 61/32; F16H 63/08;
(Continued)

(56) References Cited

U.S. PATENT DOCUMENTS 5,407,024 A    4/1995  Watson et al.
6,645,109 B2   11/2003 Williams et al.
(Continued)

FOREIGN PATENT DOCUMENTS

DE    102016210026 A1 * 12/2016   ........... B60K 17/344

OTHER PUBLICATIONS

International Search Report and Written Opinion for PCT/US2020/025981 dated Jun. 25, 2020 (11 pages).

*Primary Examiner* — Justin Holmes
(74) *Attorney, Agent, or Firm* — Bejin Bieneman PLC

(57) ABSTRACT

A driveline component includes a first plate and a second plate. A motor is engaged with the first plate. The first plate and the second plate include ramped grooves that ramp toward the other of the first plate and the second plate. Balls are disposed between the first plate and the second plate and are engaged with the ramped grooves. A shifter is engaged with the second plate. Relative rotation of the first plate and the second plate causes the balls in the ramped grooves to move the first plate and the second plate axially relative to each other. This relative rotation may be used to make one type of mode selection, and operation of the shifter by the second plate may be used to make another type of mode selection. This allows the single motor to make both selections.

20 Claims, 5 Drawing Sheets

(51) Int. Cl.
    *B60K 17/346*     (2006.01)
    *F16H 3/54*     (2006.01)
    *F16H 48/08*     (2006.01)
    *F16H 61/32*     (2006.01)
    *F16H 63/08*     (2006.01)

(52) U.S. Cl.
    CPC ............. *F16H 61/32* (2013.01); *F16H 63/08* (2013.01); *F16H 2063/3056* (2013.01); *F16H 2200/0034* (2013.01); *F16H 2200/2005* (2013.01); *F16H 2200/2033* (2013.01); *F16H 2200/2097* (2013.01)

(58) Field of Classification Search
    CPC ..... F16H 2063/3056; F16H 2200/0034; F16H 2200/2005; F16H 2200/2033; F16H 2200/2097
    See application file for complete search history.

(56) References Cited

U.S. PATENT DOCUMENTS

| | | | |
|---|---|---|---|
| 6,758,782 | B2 | 7/2004 | Matzschker et al. |
| 6,802,794 | B2 * | 10/2004 | Showalter .......... B60K 17/3467 |
| | | | 192/48.5 |
| 8,037,984 | B2 * | 10/2011 | Suzuki .................... F16H 61/32 |
| | | | 192/3.56 |
| 10,174,836 | B2 | 1/2019 | Pritchard et al. |
| 2010/0107811 | A1 * | 5/2010 | McCloy .................. F16D 28/00 |
| | | | 74/665 F |
| 2017/0203652 | A1 * | 7/2017 | Ketch ....................... F16H 7/06 |
| 2017/0321763 | A1 | 11/2017 | Younggren et al. |

\* cited by examiner

DRIVELINE COMPONENT INCLUDING MULTI-FUNCTION ACTUATOR

CROSS-REFERENCE TO RELATED APPLICATIONS

This patent application is a national stage of, and claims priority to and all the benefits of, Patent Cooperation Treaty Application No. PCT/US2020/025981, filed Mar. 31, 2020, which application claims priority to U.S. Provisional Patent Application No. 62/829,373, filed on Apr. 4, 2019, which applications are hereby incorporated herein by reference in their entireties.

BACKGROUND

A driveline transmits torque in a vehicle. The driveline may include several different components for controlling the speed (including neutral) and the magnitude of torque at various points in the driveline. For example, the driveline may include one or more clutches, gear reductions, differentials, etc., for controlling the mode selection of the driveline, i.e., selecting speed and magnitude of torque. The various mode selections are typically made by specifically-dedicated motors, mechanical actuators, etc. These motors and mechanical actuators increase cost, mass, and packaging constraints.

DETAILED DESCRIPTION

Figure 1:
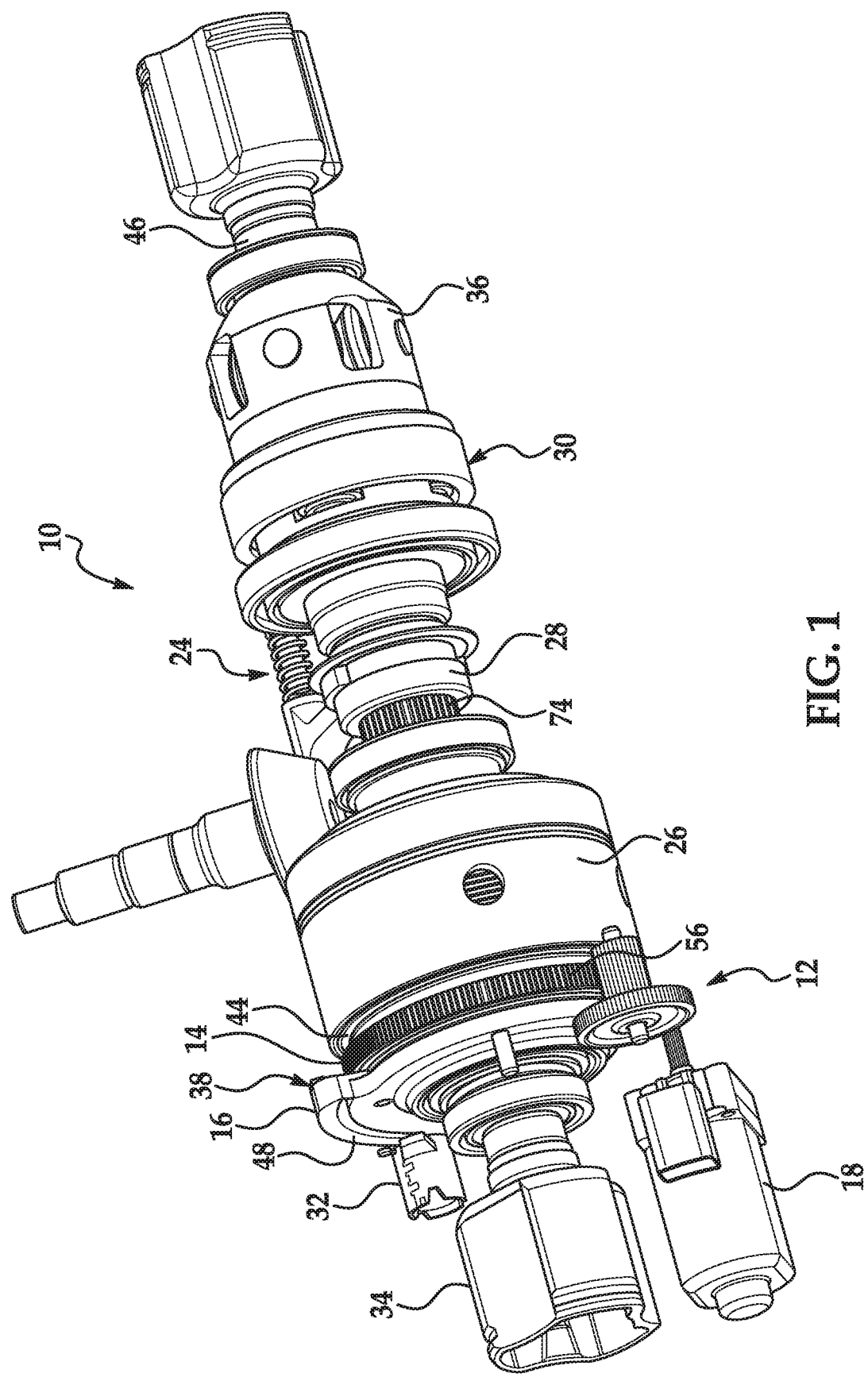
FIG. 1 is a perspective view of a driveline component.

With reference to the Figures, wherein like numerals indicate like parts throughout the several views, a driveline component 10 for a vehicle (not shown) includes an actuator 12 having a first plate 14 and a second plate 16. A motor 18 is engaged with the first plate 14. At least one of the first plate 14 and/or the second plate 16 includes ramped grooves 20 ramping toward the other of the first plate 14 and the second plate 16. Balls 22 are disposed between the first plate 14 and the second plate 16 and are engaged with the ramped grooves 20 in the first plate 14 and the second plate 16. A shifter 24 is engaged with the second plate 16.

The motor 18 may be operated to rotate the first plate 14 relative to the second plate 16. During this relative rotation, the balls 22 ride in the ramped grooves 20 and, since the ramped grooves 20 are ramped, the balls 22 drive the first plate 14 axially away from the second plate 16. Axial movement of the first plate 14 relative to the second plate 16 may be used to actuate one or more components, e.g., a clutch 26, as described below. Further, movement of the second plate 16 by the motor 18 moves the shifter 24 to actuate another component, e.g., engagement of a shift collar 28 of the shifter 24 with a gear assembly 30, as described below, i.e., the actuator 12 is a multi-function actuator.

Specifically, in the example shown in the Figures, the actuator 12 includes a lock 32 releasably engageable with the second plate 16. The lock 32 may be supported by a casing (not shown) that is fixed relative to the rest of the vehicle. The lock 32 may engage the second plate 16 to ground the second plate 16, e.g., to maintain the second plate 16 stationary relative to the casing. When the second plate 16 is grounded, the motor 18 may be rotated to rotate the first plate 14 relative to the second plate 16 resulting in axial movement of the first plate 14 relative to the second plate 16 due to movement of the balls 22 in the ramped grooves 20. As one example, this axial movement of the first plate 14 may actuate the clutch 26. In this example, the driveline component 10 may include an input shaft 34 and a differential 36, and the clutch 26 delivers torque from the input shaft 34 to the differential 36 when the clutch 26 is actuated.

The lock 32 may disengage the second plate 16 to unground the second plate 16, e.g., to allow the second plate 16 to rotate relative to the casing. When the second plate 16 is ungrounded, the motor 18 may be activated to rotate the first plate 14. In this position, the first plate 14 may rotate the second plate 16. Specifically, the balls 22 deliver torque from the first plate 14 to the second plate 16 to transfer rotation from the motor 18 to the second plate 16. In the example shown in the Figures, the second plate 16 includes a ramped surface 38 on which the shifter 24 is slidably engaged. Rotation of the second plate 16 axially adjusts the shifter 24 as the shifter 24 rides along the ramped surface 38.

In the example shown in the Figures, the driveline component 10 may include the gear assembly 30 between the clutch 26 and the differential 36. The shifter 24 may be moved by the second plate 16 to move the shift collar 28 between a disengaged position disengaged with the gear assembly 30, in which case torque may be directly transmitted from the clutch 26 to the differential 36, and an engaged position engaged with the gear assembly 30, in which case torque may be transmitted from the clutch 26 to the gear assembly 30 and from the gear assembly 30 to the differential 36. The gear assembly 30 provides a gear ratio between the clutch 26 and the differential 36. In such an example, when the shift collar 28 is disengaged with the gear assembly 30, the motor 18 may rotate the first plate 14 in a first direction to de-actuate the clutch 26 and rotate the first plate 14 further in the first direction to drive rotation of the second plate 16 to move the shift collar 28 to the engaged position. When the shift collar 28 is in the engaged position, the lock 32 may engage the second plate 16 to the ground the second plate 16 and, in such a position, the motor 18 may be activated to rotate the first plate 14 relative to the second plate 16 in a second direction (i.e., opposite the first direction) to actuate the clutch 26. When the shift collar 28 is in the engaged position, the clutch 26 may be actuated and de-actuated by activating the motor 18 when the lock 32 is engaged with the second plate 16. Further, when the shift collar 28 is in the engaged position, the lock 32 may be disengaged with the second plate 16 and the motor 18 may be activated to rotate the first plate 14 and the second plate 16 in the second direction to move the shift collar 28 to the disengaged position as the shifter 24 rides on the ramped surface 38.

Figure 2:
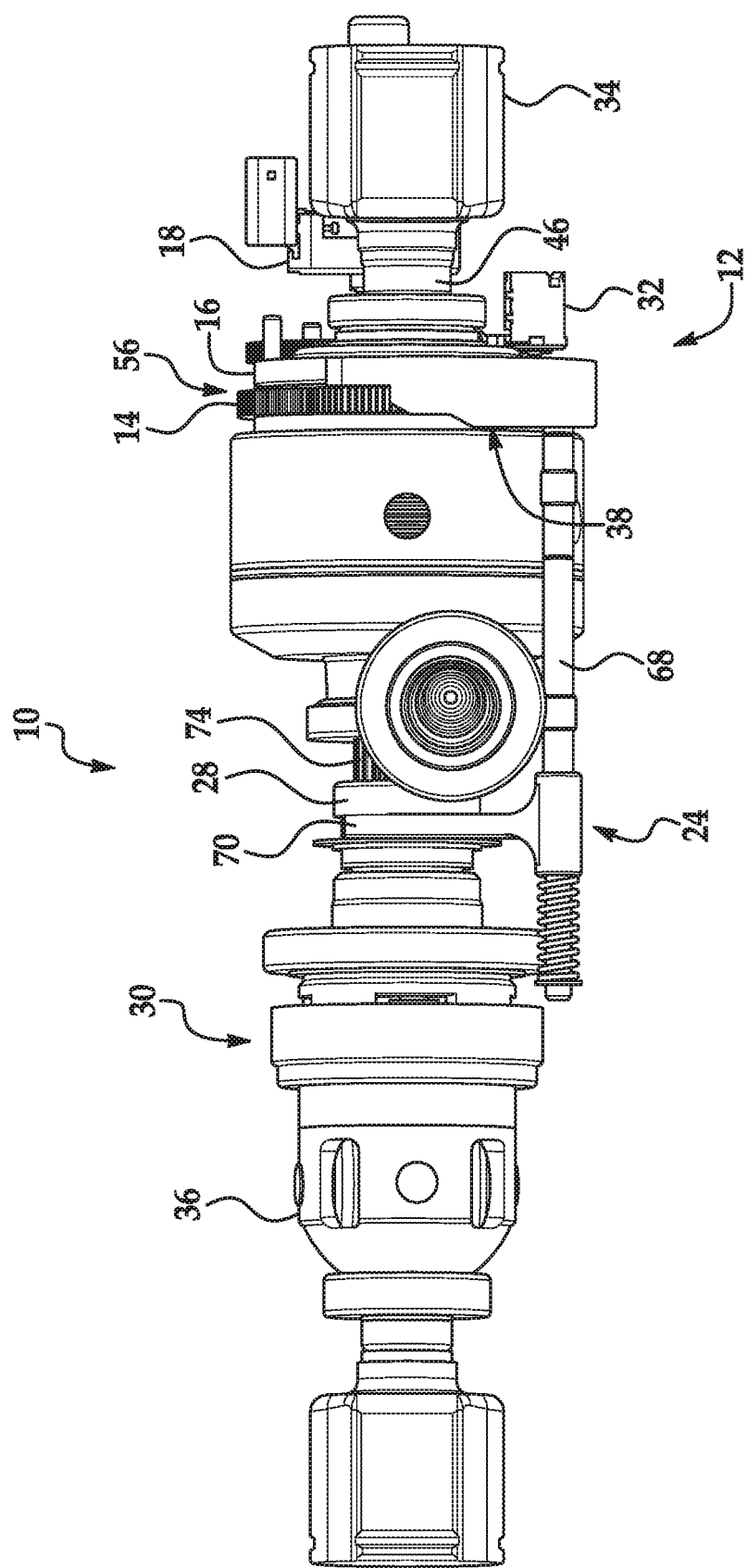
FIG. 2 is a side view of the driveline component.
Figure 3:
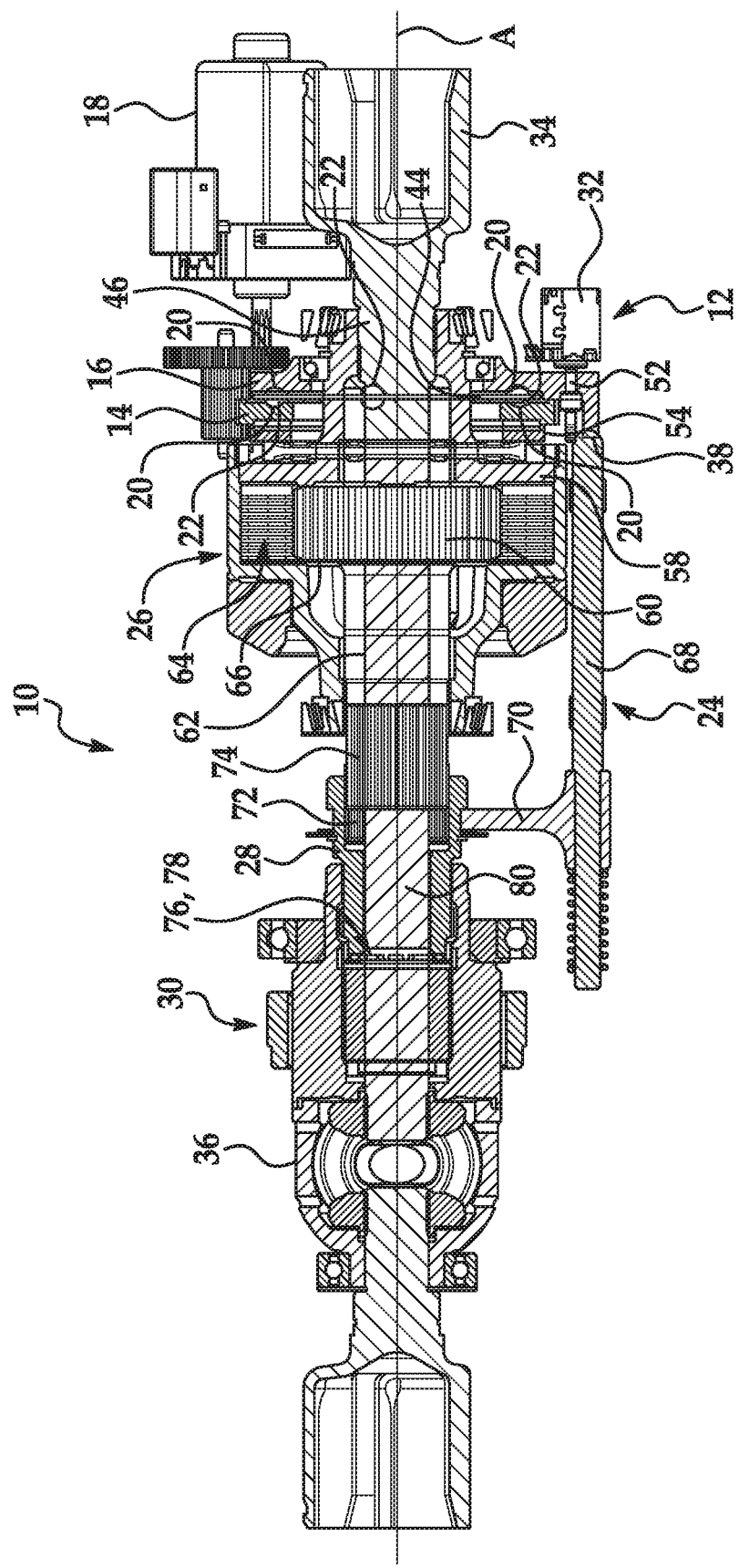
FIG. 3 is a cross-sectional view of the driveline.

With reference to FIGS. 1-3, the driveline component 10 includes the differential 36 powered by the input shaft 34. The differential 36 is shown by way of example, and the driveline component 10 may include any elements between the input shaft 34 and an output shaft 62 in addition to or in the alternative to the differential 36.

With reference to FIGS. 1-3, the driveline component 10 includes the actuator 12. The actuator 12 includes the first plate 14, the second plate 16, and the balls 22. As set forth above, the first plate 14 and/or the second plate 16 includes ramped grooves 20 (FIG. 3) ramping toward the other of the first plate 14 and the second plate 16. In other words, the first plate 14 and the second plate 16 are rotatable about an axis A and are spaced from each other along the axis A and the ramped grooves 20 are ramped along the axis A, i.e., change depth along the axis A. The ramped grooves 20 may extend generally arcuately around the axis A. The ramp of the ramped grooves 20 move the first plate 14 and the second plate 16 relative to each other along the axis A as the balls 22 move along the ramped grooves 20. The first plate 14 and the second plate 16 may include any suitable number of ramped grooves 20 and a corresponding number of balls 22, i.e., one ball 22 in each ramped groove 20.

In one example, the first plate 14 and the second plate 16 may both include the ramped grooves 20 and the ramped grooves 20 on the first plate 14 may be mirror images of the ramped grooves 20 on the second plate 16. As another example, one of the first plate 14 and the second plate 16 may have the ramped grooves 20 and the other of the first plate 14 and the second plate 16 may include flat grooves that mirror the path of the ramped grooves 20 about the axis.

The ramped grooves 20 in at least one of the first plate 14 and the second plate 16 ramps toward the other of the first plate 14 and the second plate 16, i.e., the ramped grooves 20 force the balls toward or away from the other of the first plate 14 and the second plate 16 as the balls 22 roll along the ramped grooves 20. As one example, the ramped grooves 20 change in thickness, i.e., in a direction radially from the axis A. Accordingly, the peripheral rim of the ramped grooves 20 contact the balls 22 and control the depth of balls 22 in the ramped grooves 20 as the balls 22 ride in the ramped grooves. In addition or in the alternative, as another example, the ramped grooves 20 change in depth, i.e., along the axis A. In such an example, the balls 22 ride on the bottom of the ramped grooves 20.

Figure 6:
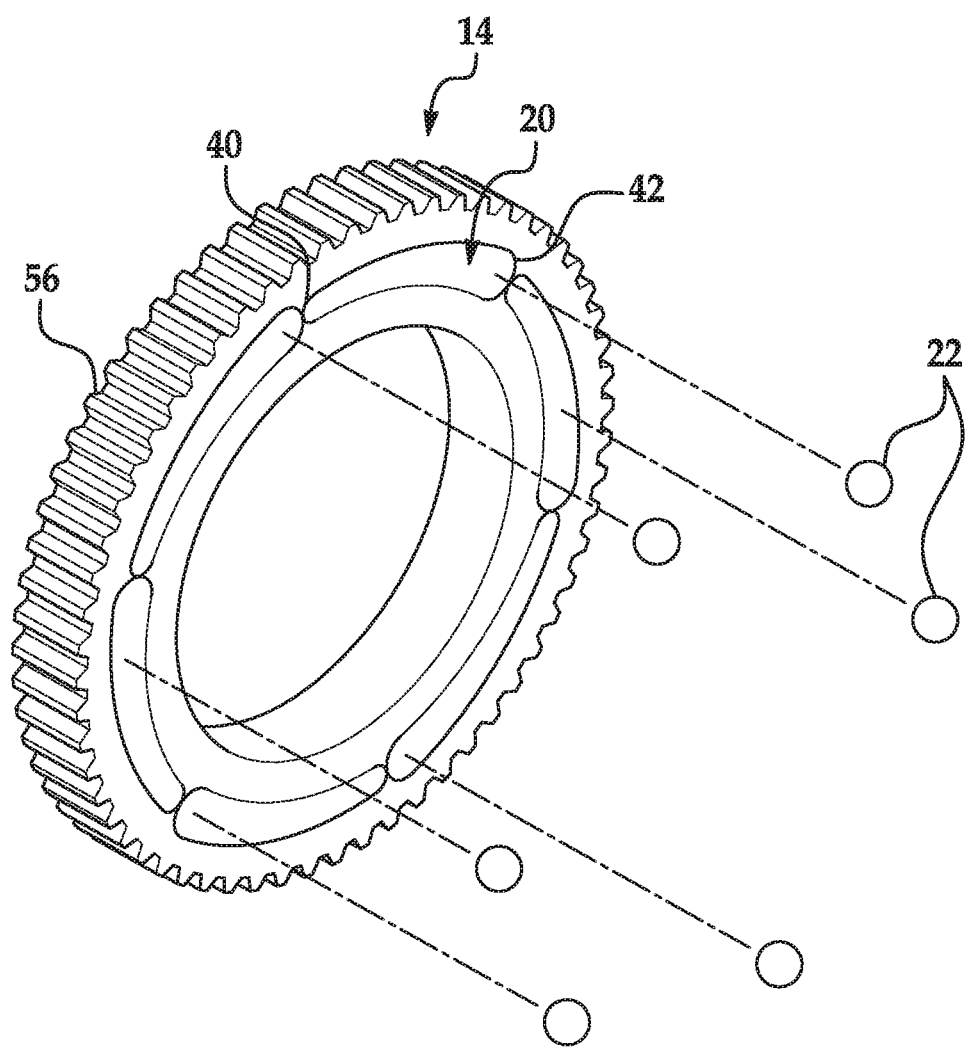
FIG. 6 is a perspective view of the first plate.

With reference to FIG. 6, the ramped grooves 20 each include a first end 40 and a second end 42. In the example shown in FIG. 6, the ramped grooves 20 open and/or deepen at the second end 42 relative to the first end 40. Accordingly, the balls 22 move the first plate 14 and the second plate 16 away from each other when the balls are in the first ends 40 and allow the first plate 14 and the second plate 16 to move toward each other when the balls are in the second ends 42. The first end 40 and the second end 42 are designed to stop the respective ball 22 in the ramped groove 20. In other words, the first end 40 and the second end 42 create hard stops for the balls 22. When the ball 22 abuts the first end 40 or the second end 42, the ball 22 transmits torque from the first plate 14 to the second plate 16. Accordingly, second plate 16 may be rotated by the motor 18 through transmission of torque from the motor 18 through the ball 22 at the first end 40 or the second end 42.

The balls 22 are retained between the first plate 14 and the second plate 16. The actuator 12 may include one or more retainer plates 44 to retain the balls 22 between the first plate 14 and the second plate 16. The balls 22 are spherical.

The actuator 12 may include a spindle 46 that extends through the first plate 14 and the second plate 16. At least one of the first plate 14 and the second plate 16 may slide along the spindle 46 when the balls 22 move the first plate 14 and the second plate 16 relative to each other along the axis A. As one example, the second plate 16 may be fixed to the spindle 46 along the axis A relative and the first plate 14 may be slidable along the axis A on the spindle 46, e.g., when the balls 22 in the ramped grooves 20 force the first plate 14 away from the second plate 16. The input shaft 34 may extend through the spindle 46 and may rotate relative to the spindle 46.

The actuator 12 includes the lock 32 for locking the second plate 16, as described above. The lock 32 is releasably engageable with the second plate 16 and the second plate 16 is rotatable by the motor 18 when the lock 32 is disengaged with the second plate 16. Specifically, the motor 18 rotates the first plate 14 and torque is transmitted from the first plate 14 to the second plate 16 through the balls 22 (i.e., when engaged with the first end 40 or second end 42 of the ramped grooves 20). In such a position, when the lock 32 is disengaged from the second plate 16, the second plate 16 is free to rotate with the first plate 14. When the lock 32 is engaged with the second plate 16, the second plate 16 is grounded and the first plate 14 rotates relative to the second plate 16, i.e., to axially move the first and second plate 16s relative to each other along the axis.

The lock 32 may be, for example, a solenoid (as shown in the Figures) releasably engageable with the second plate 16. The solenoid may be fixed relative to the casing (not shown).

Figure 4:
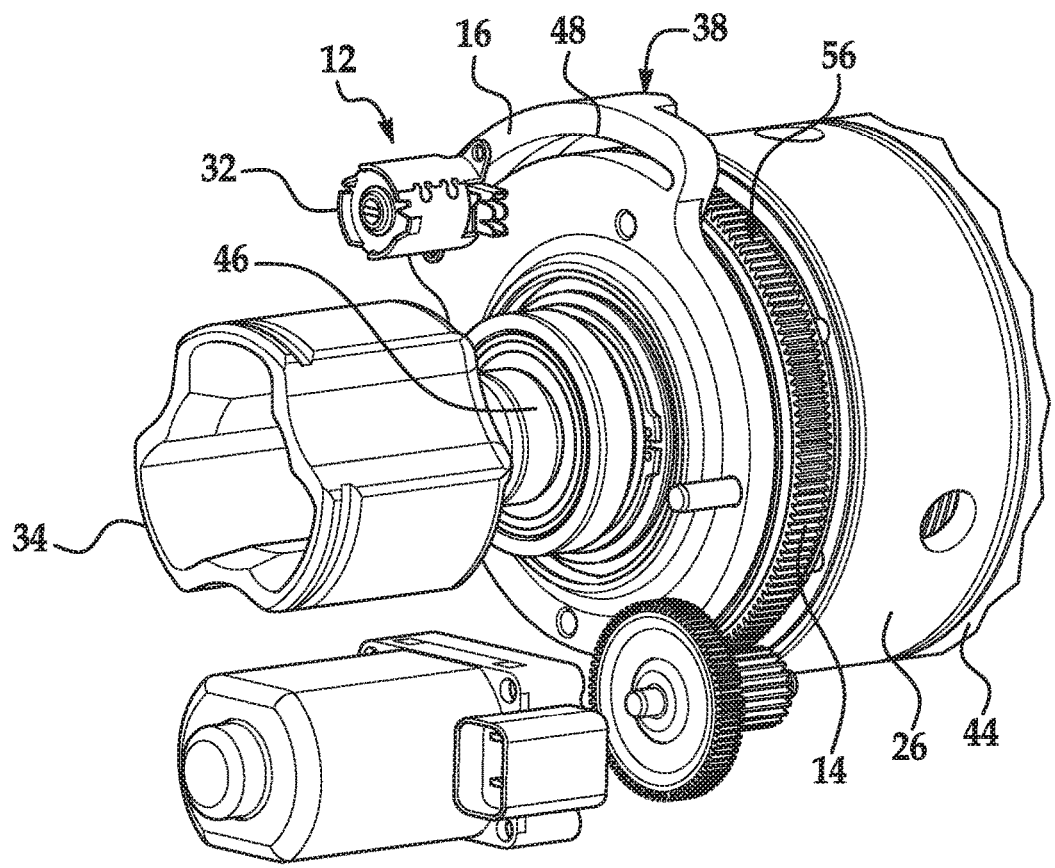
FIG. 4 is a magnified view of one end of the driveline component including a motor engaged with a first plate and a solenoid engaged with a second plate.
Figure 5:
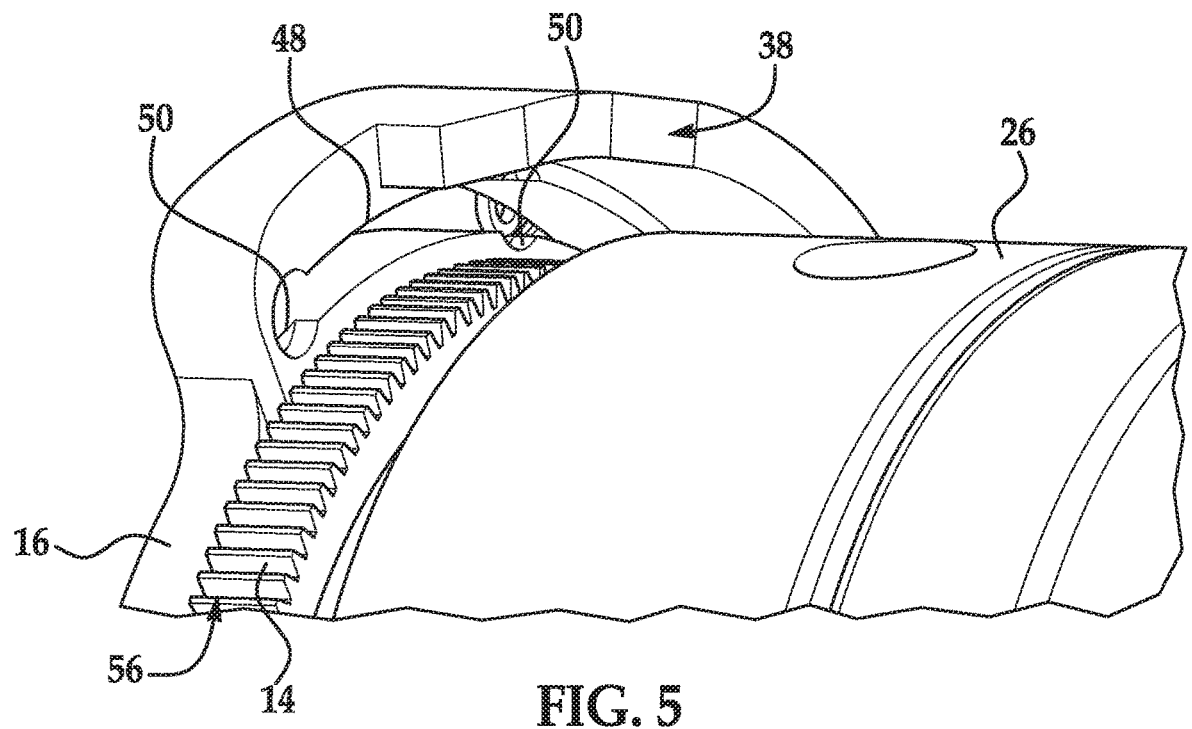
FIG. 5 is a magnified view of a portion of the first plate and the second plate including a slot and holes in the second plate.

The lock 32 may releasably engage the second plate 16 in any suitable fashion. With reference to FIGS. 4 and 5, as one example, when the lock 32 is a solenoid, the second plate 16 may have a slot 48 and holes 50 (FIG. 5) spaced from each other along the slot 48. The holes 50 are positioned to releasably receive the solenoid. Specifically, the solenoid includes an armature 52 (FIG. 3) moveable along the axis A relative to the second plate 16 into and out of engagement with the second plate 16. The armature 52 may extend through the slot 48 and may include a head 54 (FIG. 3) that is designed to engage one of the holes 50 when aligned with the head 54. When the head 54 is engaged with the hole 50, the solenoid grounds the second plate 16 such that the first plate 14 rotates relative to the second plate 16 when driven by the motor 18.

The motor 18 may be mounted to the casing (not shown). The motor 18 may be of any suitable type, e.g., an electric motor such as a DC motor.

The motor 18 is engaged with the first plate 14. As an example, the first plate 14 may include teeth 56 around the periphery of the first plate 14 and the motor 18 may indirectly or directly engage the teeth 56. As an example, as shown in the Figures, the actuator 12 may include a gear set, e.g., a reduction gear set, engaging the motor 18 and the first plate 14.

With reference to FIG. 3, the actuator 12 may include a transfer disk 58 (FIG. 3). The transfer disk 58 may be movable along the axis A by the first plate 14 to actuate the clutch 26. The transfer disk 58, for example, may slide along the spindle 46.

The clutch 26 is between the input shaft 34 and the differential 36 and is actuatable by rotation of the first plate 14 relative to the second plate 16 by the motor 18. Specifically, the clutch 26 is actuatable by rotation of the first plate 14 relative to the second plate 16 when the lock 32 is engaged with the second plate 16.

With reference to FIG. 3, the clutch 26 may include a ring gear 60 fixed to and rotatable by the input shaft 34. An output shaft 62 is selectively rotatable relative to the ring gear 60, i.e., is rotatable relative to the ring gear 60 when the clutch 26 is de-actuated and rotates with the ring gear 60 when the clutch 26 is actuated. Specifically, the clutch 26 may include clutch plates 64 that rotate with the ring gear 60 (i.e., are rotationally fixed to the ring gear 60) and are axially slidable on the ring gear 60. The clutch 26 includes a friction plate 66 that rotates with the output shaft 62 (i.e., is rotationally fixed to the output shaft 62. When the clutch plates 64 are disengaged with the friction plate 66, the ring gear 60 rotates relative to the output shaft 62. When the clutch plates 64 are engaged with the friction plate 66, the clutch plates 64 and friction plate 66 deliver torque from the ring gear 60 to the output shaft 62.

The clutch plates 64 are spring-loaded to be biased away from engagement with the friction plate 66. The first plate 14 is designed to move the clutch plates 64 toward the friction plate 66 to engage the clutch plates 64 and the friction plate 66. Specifically, the first plate 14 moves the transfer disk 58, as described above, against the clutch plates 64 to push the clutch plates 64 into engagement with the friction plate 66.

With reference to FIGS. 2 and 3, the driveline component 10 includes the shifter 24. The shifter 24 is engaged with the second plate 16. Specifically, the shifter 24 is moveable by rotation of the second plate 16 by the motor 18 when the lock 32 is disengaged with the second plate 16.

The shifter 24 may be of any suitable type. In the example shown in the Figures, the shifter 24 may include a shift rod 68, a shift fork 70, and the shift collar 28. In such an example, the shift rod 68 is fixed relative to the shift fork 70 and the shift collar 28 rides on the ramped surface 38 of the second plate 16 such that the shift rod 68, the shift fork 70, and the shift collar 28 move together as a unit as the shift rod 68 rides on the ramped surface 38. The shift rod 68 may be biased toward the ramped surface 38 by a spring (FIGS. 2 and 3).

The shifter 24 is slidably engaged with the ramped surface 38. For example, the shift rod 68 may be spring-biased toward the ramped surface 38 and may positioned such that the shift rod 68 maintains contact with the ramped surface 38 as the second plate 16 rotates, i.e., when rotated by the motor 18 when the lock 32 is disengaged with the second plate 16.

With reference to FIG. 3, the shift collar 28 selectively engages the gear assembly 30 when the shift collar 28 is axially moved as ramped surface 38 moves relative to the shift rod 68. Specifically, the shift collar 28 may include internal splines 72 engaged with external splines 74 on the output shaft 62 of the clutch 26. The shift collar 28 internal splines 72 and external splines 74 are rotationally locked such that the shift collar 28 rotates with the output shaft 62 and the internal splines 72 are axially slidable on the external splines 74 such that the shift collar 28 is slidable toward and away from the gear assembly 30. The shift collar 28 includes teeth 76 that engage teeth 78 on the gear assembly 30 when the shift collar 28 is moved into engagement with the gear assembly 30. In FIG. 3, the teeth 76 protrude to the left toward the gear assembly 30, and the teeth 78 extend to the right toward the shift collar 28. Still referring to FIG. 3, the teeth 76 move with the shift collar 28 to the left to engage the teeth 78, and the teeth move with the shift collar 28 to the right to disengage the teeth 78. The teeth 76, 78 are engaged in FIG. 3.

A drive shaft 80 extends from the output shaft 62 of the clutch 26 and is rotationally fixed to the output shaft 62 and the shift collar 28. When the shift collar 28 is disengaged with the gear assembly 30, i.e., when teeth 76 are disengaged with teeth 78, the output shaft 62 drives the gear assembly 30. In such a setting, the drive shaft 80 drive the differential 36, i.e., without a gear ratio applied by the gear assembly 30. In other words, the gear assembly 30 is in a direct drive position. When the shift collar 28 is engaged with the gear assembly 30, i.e., when teeth 76 are engaged with teeth 78, the gear assembly 30 is in a gear reduction setting such that a reduction is applied to the differential 36.

Specifically, the gear assembly 30 may be a planetary gear assembly 30 including a sun gear, ring gear 60, planet gears, and a planet carrier. When the shift collar 28 engages the gear assembly 30 the planetary gear assembly 30 drives the differential 36. Specifically, the torque from the clutch 26 is transmitted to the sun gear, through planet gears that drive the planet carrier, which is attached to the differential 36, that multiply the torque output by the clutch 26.

In the example shown in the Figures, the shifter 24 moves between a high range position and a low range position. The shift collar 28 is disengaged with the gear assembly 30 in the high range position, and the shift collar 28 is engaged with the gear assembly 30 in the low range position.

In operation, the motor 18, i.e., one single motor, controls both actuation/de-actuation of the clutch 26 and mode selection, e.g., high range and low range described above. Specifically, the force to actuate the clutch 26 is relatively high and the length of movement of the shifter 24 for mode shifts is relatively long. The actuator 12 and shifter 24 accomplish both of these attributes to perform both functions with one motor 18. This reduces both mass, cost, and packaging constraints.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A driveline component comprising:
   a first plate and a second plate;
   a motor engaged with the first plate;
   ramped grooves in at least one of the first plate and the second plate and ramping toward the other of the first plate and the second plate;
   balls disposed between the first plate and the second plate and engaged with the ramped grooves in the first plate and the second plate; and
   a shifter engaged with the second plate, the shifter being movable by the second plate along the axis.

2. The driveline component as set forth in claim 1, further comprising a lock releasably engageable with the second plate.

3. The driveline component as set forth in claim 2, further comprising a clutch, the clutch being actuatable by rotation of the first plate relative to the second plate when the lock is engaged with the second plate.

4. The driveline component as set forth in claim 3, wherein the shifter is moveable by rotation of the second plate by the motor when the lock is disengaged with the second plate.

5. The driveline component as set forth in claim 3, wherein the second plate includes a ramped surface and the shifter is slidably engaged with the ramped surface.

6. The driveline component as set forth in claim 1, further comprising a solenoid releasably engageable with the second plate.

7. The driveline component as set forth in claim 6, wherein the second plate has holes spaced from each other and positioned to releasably receive the solenoid.

8. The driveline component as set forth in claim 1, wherein the second plate includes a ramped surface and the shifter is slidably engaged with the ramped surface.

9. The driveline component as set forth in claim 1, further comprising a clutch actuatable by rotation of the first plate relative to the second plate.

10. The driveline component as set forth in claim 1, further comprising a shift collar connected to the shifter and moveable by the shifter.

11. The driveline component as set forth in claim 10, further comprising a gear, the shift collar being moveable by the shifter into and out of engagement with the gear.

12. The driveline component as set forth in claim 1, wherein the first plate and the second plate are spaced from each other along an axis.

13. The driveline component as set forth in claim 1, further comprising a lock releasably engageable with the second plate, the second plate being rotatable by the motor when the lock is disengaged with the second plate.

14. The driveline component as set forth in claim 13, further comprising a clutch actuatable by rotation of the first plate relative to the second plate.

15. The driveline component as set forth in claim 1, further comprising an input shaft and a differential.

16. The driveline component as set forth in claim 15, further comprising a clutch between the input shaft and the differential and actuatable by rotation of the first plate relative to the second plate by the motor.

17. The driveline component as set forth in claim 16, wherein the second plate has a ramped surface and the shifter is moveable along the ramped surface as the second plate is rotated by the motor.

18. The driveline component as set forth in claim 17, further comprising a lock releasably engageable with the second plate, the second plate being rotatable by the motor when the lock is disengaged with the second plate.

19. The driveline component as set forth in claim 17, further comprising a gear and a shift collar connected to the shifter and moveable by the shifter into and out of engagement with the gear.

20. A driveline component comprising:
a first plate and a second plate;
a motor engaged with the first plate;
ramped grooves in at least one of the first plate and the second plate and ramping toward the other of the first plate and the second plate;
balls disposed between the first plate and the second plate and engaged with the ramped grooves in the first plate and the second plate;
a shifter engaged with the second plate; and
a lock releasably engageable with the second plate, the second plate being rotatable by the motor when the lock is disengaged with the second plate.

* * * * *